(12) United States Patent
Amanai

(10) Patent No.: US 7,092,172 B2
(45) Date of Patent: Aug. 15, 2006

(54) IMAGING OPTICAL SYSTEM AND ELECTRONIC APPARATUS USING THE SAME

(75) Inventor: Takahiro Amanai, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/863,824

(22) Filed: Jun. 9, 2004

(65) Prior Publication Data

US 2005/0024748 A1 Feb. 3, 2005

(30) Foreign Application Priority Data

| Jun. 11, 2003 | (JP) | ............................. 2003-166330 |
| Jun. 3, 2004 | (JP) | ............................. 2004-165528 |

(51) Int. Cl.
*G02B 9/34* (2006.01)

(52) U.S. Cl. ..................................... 359/774; 359/771

(58) Field of Classification Search ........ 359/771–772, 359/774
See application file for complete search history.

(56) References Cited

U.S. PATENT DOCUMENTS

| 4,101,203 | A | * | 7/1978 | Yamaguchi | ................. 359/765 |
| 6,285,507 | B1 | * | 9/2001 | Sakamoto | .................... 359/642 |
| 6,392,816 | B1 | * | 5/2002 | Hamano | ...................... 359/683 |
| 6,624,952 | B1 | * | 9/2003 | Kuwa et al. | ................ 359/726 |
| 6,646,814 | B1 | * | 11/2003 | Uzawa et al. | ............... 359/687 |

FOREIGN PATENT DOCUMENTS

| JP | 64-74516 | * | 3/1989 |
| JP | 5-210048 | * | 8/1993 |
| JP | 08-286108 | | 11/1996 |
| JP | 09-258100 | | 10/1997 |

* cited by examiner

*Primary Examiner*—Jordan M. Schwartz
(74) *Attorney, Agent, or Firm*—Pillsbury Winthrop Shaw Pittman LLP

(57) ABSTRACT

The image forming optical system includes, in order from the object side, a meniscus, a first lens having positive refracting power with a convex surface directed toward the object side, an aperture stop, a meniscus, a second lens having negative refracting power with a concave surface directed toward the object side, a third lens having positive refracting power with a convex surface directed toward the image side, and a biconvex, fourth lens having positive refracting power. The fourth lens has at least one aspherical surface and satisfies the condition:

$$1.0 < \phi m/\phi p < 50.0$$

where $\phi m$ and $\phi p$ represent power of the fourth lens at a position of the maximum light height and at the paraxial position, respectively. Also, the following condition is satisfied:

$$0.3 < f1/f < 2.0$$

where f1 and f represent the focal lengths of the first lens and of the entire image forming optical system, respectively.

10 Claims, 10 Drawing Sheets

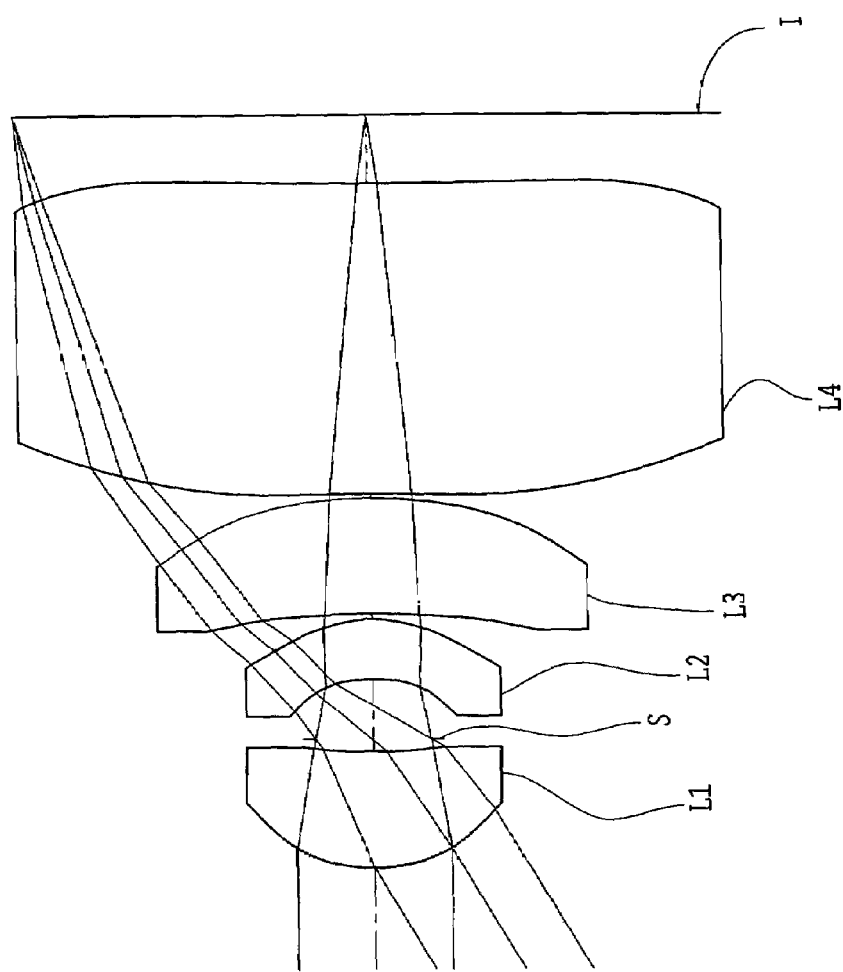

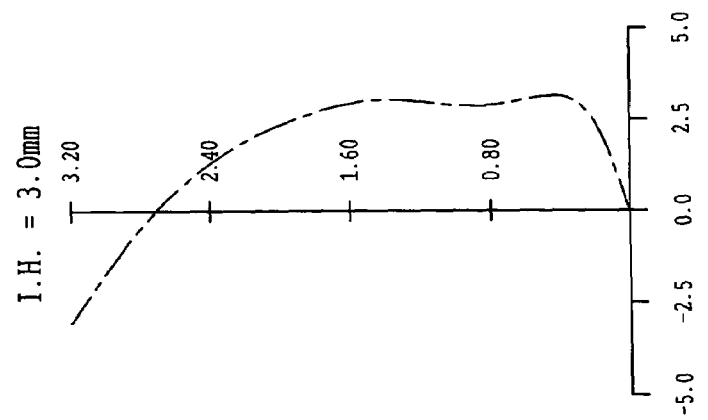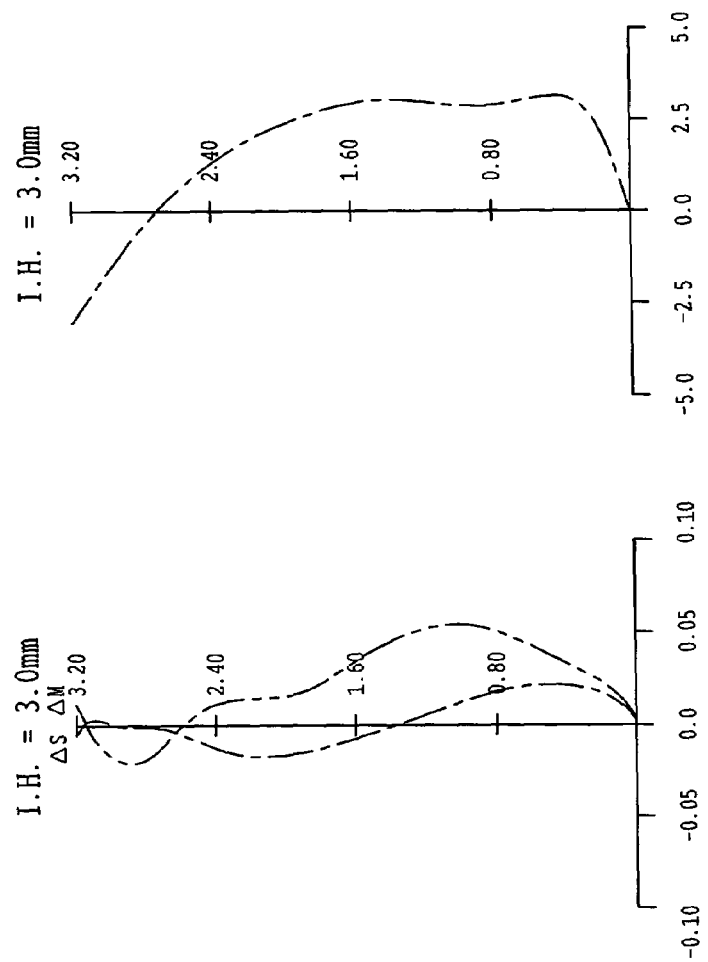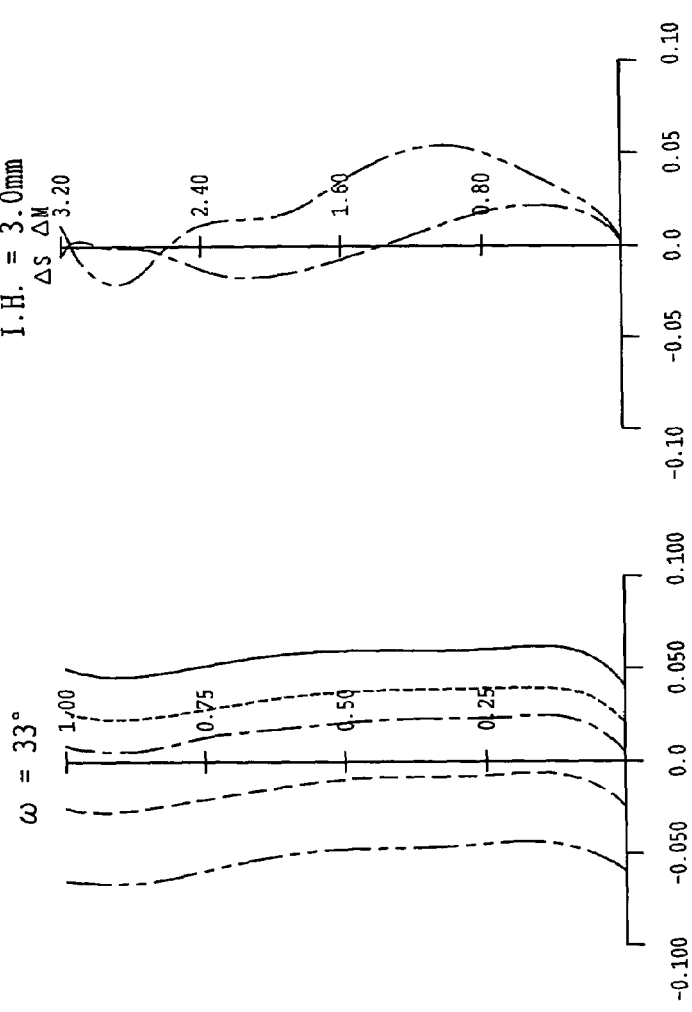

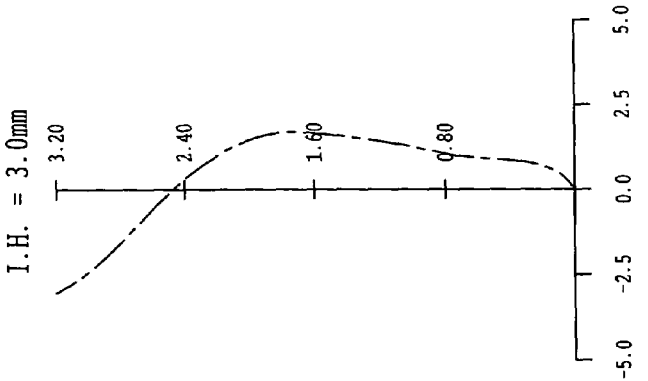
Fig.4A SPHERICAL ABERRATION ω = 33°
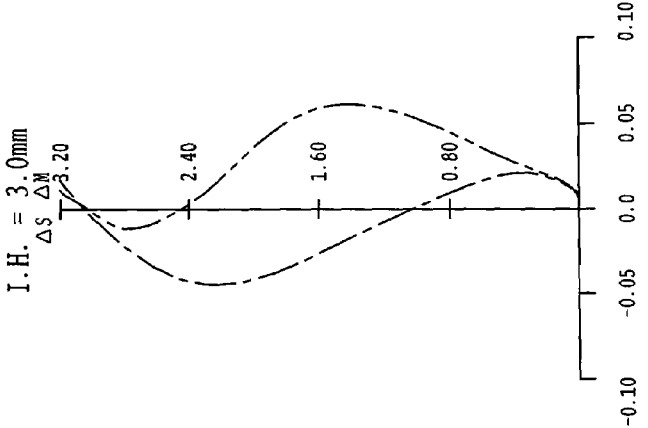
Fig.4B ASTIGMATISM
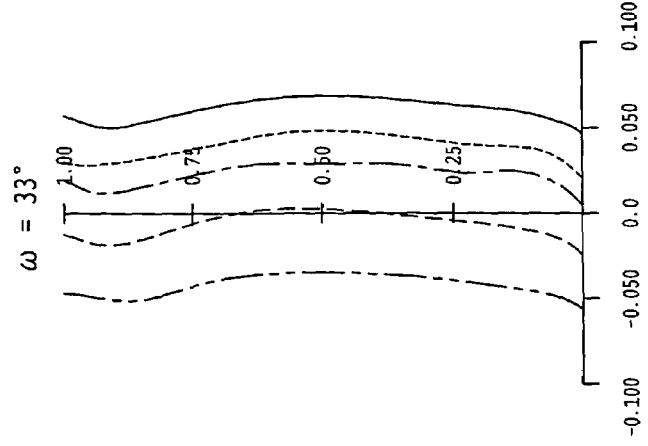
Fig.4C DISTORTION

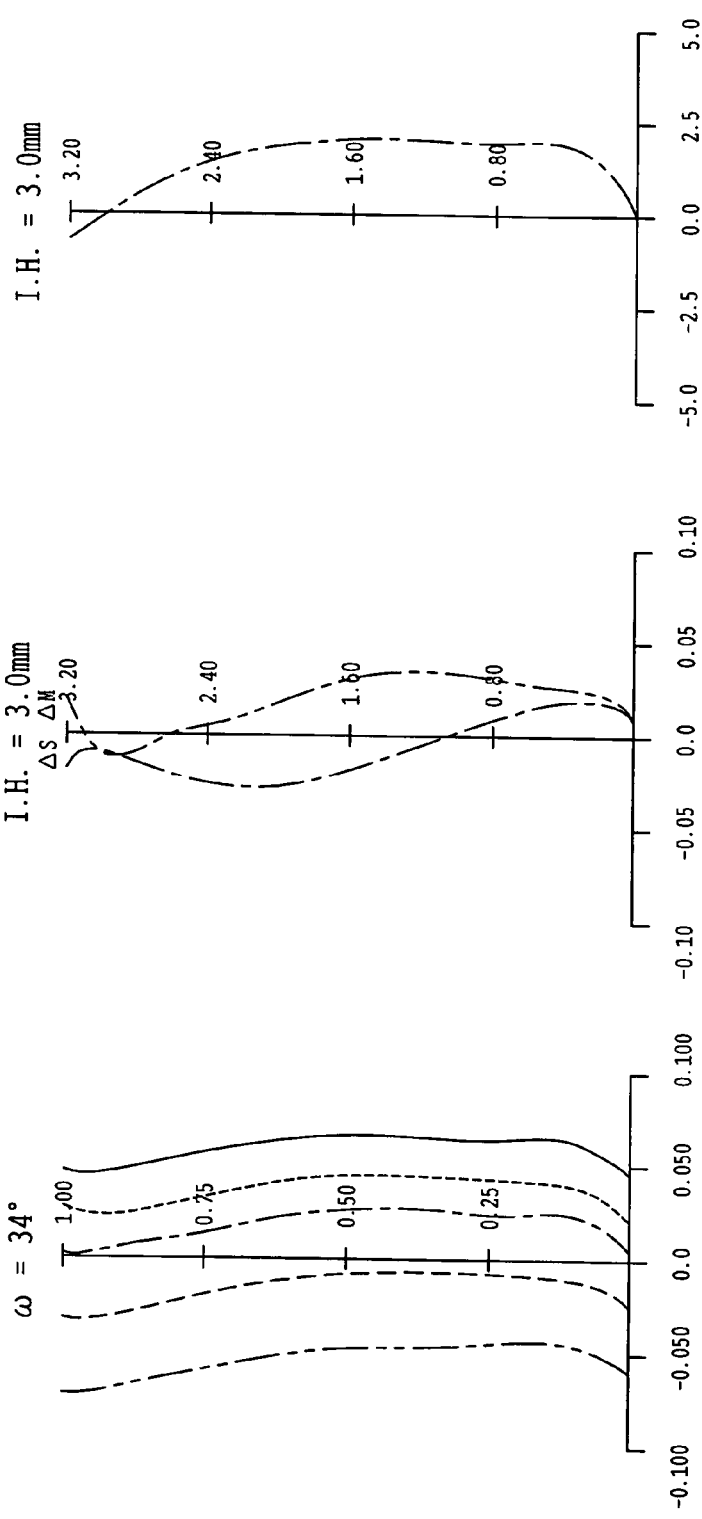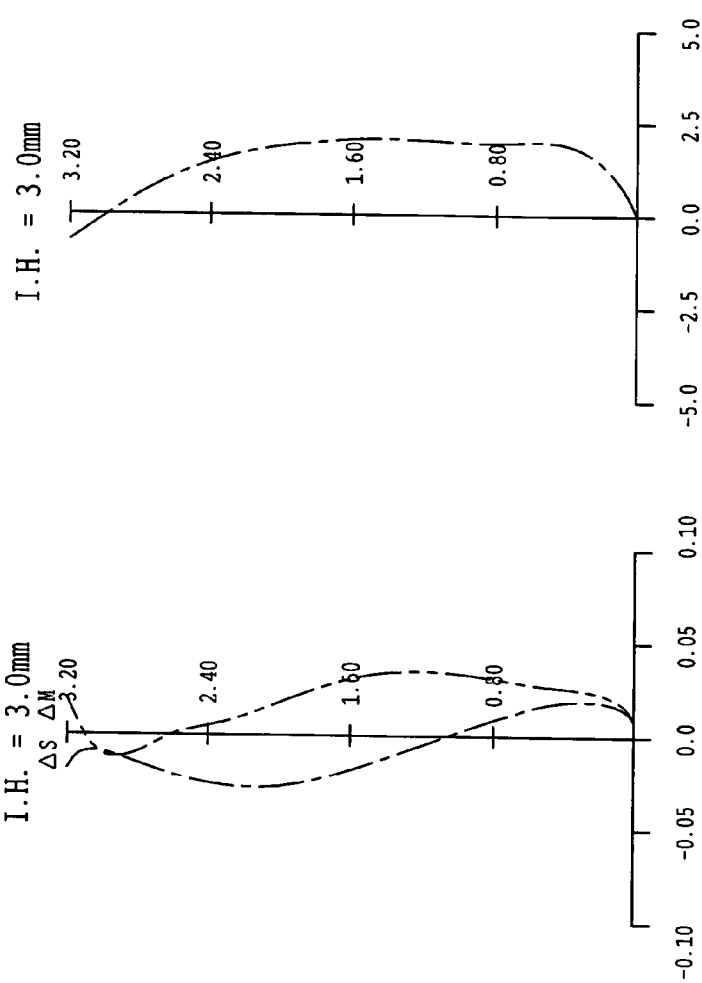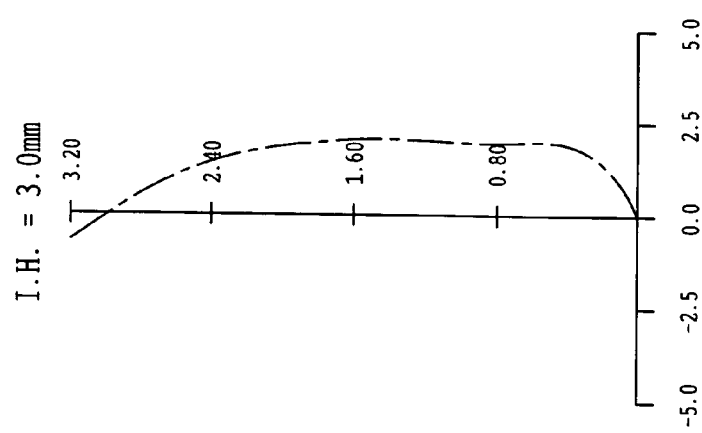

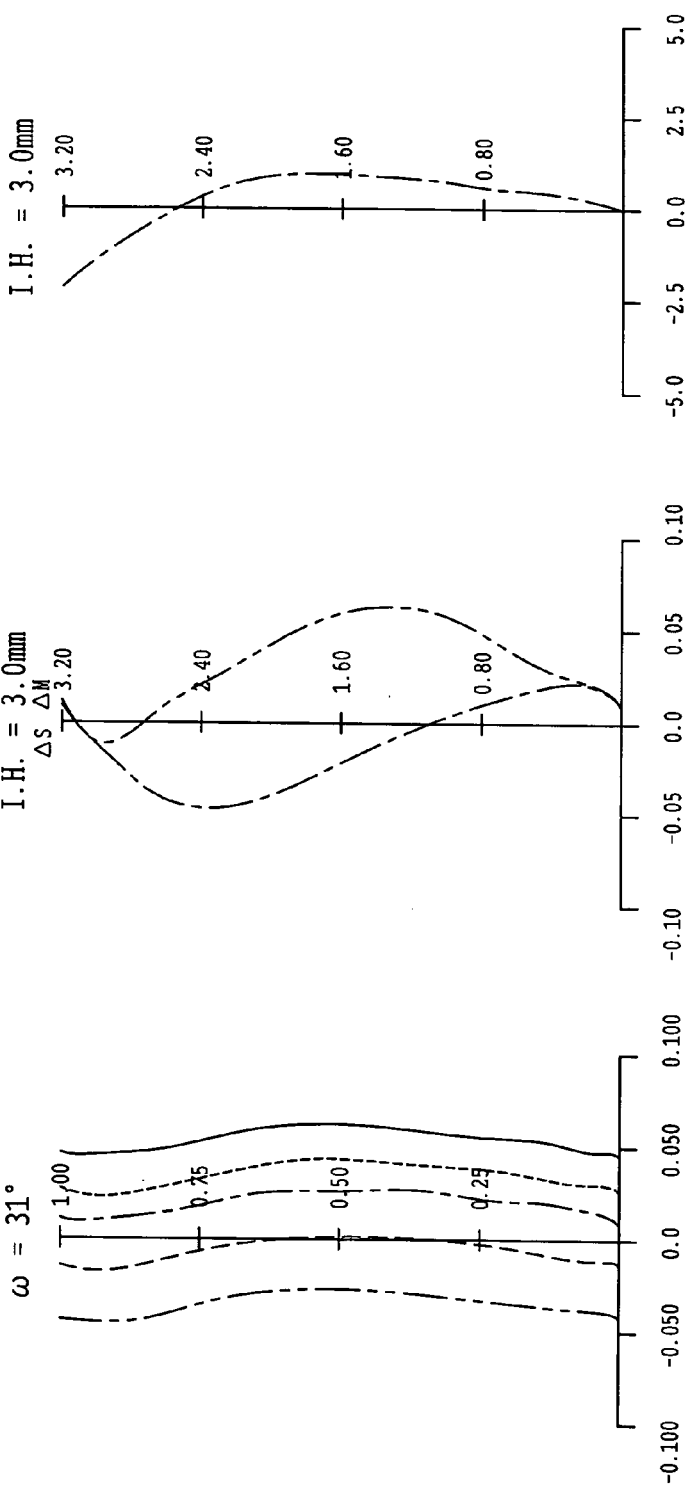
Fig.8A SPHERICAL ABERRATION
Fig.8B ASTIGMATISM
Fig.8C DISTORTION

IMAGING OPTICAL SYSTEM AND ELECTRONIC APPARATUS USING THE SAME

This application claims the benefit of priority from JP 2003-166330, filed Jun. 11, 2003, and JP 2004-165528, filed Jun. 3, 2004.

BACKGROUND OF THE INVENTION

1. Field of the Invention

The present invention relates to an image forming optical system which can be used for an imaging unit with the solid-state imaging element of CCD, CMOS and the like. For example, it relates to an image forming optical system which can be used for a miniature camera and a monitor camera and the like which are equipped in, for example, a digital still camera, a digital video camera, a cellular phone, PC and the like.

Furthermore, the present invention also relates to an electronic instrument such as a digital still camera, a digital video camera, a cellular phone, PC and the like which use the image forming optical system.

2. Description of the Related Art

In recent years, electronic cameras for taking a photograph by using a solid-state imaging element like CCD and CMOS instead of using a silver salt film have become popular. In such electronic cameras, for an imaging unit which is equipped in a portable type computer or a cellular phone and the like, miniaturization and weight-lightening have been particularly demanded.

SUMMARY OF THE INVENTION

The image forming optical system of the present invention comprises in order from an object side, a first lens which is meniscus lens having positive refracting power and a convex surface directed toward an object side, an aperture stop, a second lens which is meniscus lens having negative refracting power and a concave surface directed toward the object side, a third lens having positive refracting power and a convex surface directed toward the image side, and a fourth lens having positive refracting power and double convex surfaces.

The image forming optical system of the present invention is constituted that at least one of surfaces of the fourth lens which is aspherical, and the following condition is satisfied:

$$1.0 < \phi m/\phi P < 50.0$$

Where $\phi m$ represents the power of the fourth lens at the position of the maximum light height and $\phi p$ represents the power of the fourth lens at the position of the paraxis.

The image forming optical system according to the present invention satisfies the following condition:

$$0.3 < f1/f < 2.0$$

where f1 represents focal length of the first lens and f represents the whole focal length of the whole image forming optical system.

The image forming optical system according to the present invention satisfies the following condition:

$$0.30(1/\mu m) < Fno/P(\mu m) < 2.50(1/\mu m)$$

where Fno represents the F number fully opened and P represents the pixel pitch of an imaging element.

The image forming optical system according to the present invention satisfies the following condition:

$$0.03 < ML/TL < 0.15$$

where TL represents the whole length of the image forming optical system and ML represents the minimum thickness on the axis of a plastic lens constituting the image forming optical system.

The electric device according to the present invention is equipped with the image forming optical system mentioned above.

These and other features and advantages of the present invention will become apparent from the following detailed description of the preferred embodiments when taken in conjunction with the accompanying drawings.

BRIEF DESCRIPTION OF THE DRAWINGS

FIG. 1 is a sectional view showing an optical arrangement developed along the optical axis in the first embodiment of an image forming optical system according to the present invention.

FIGS. 2A, 2B and 2C are diagrams showing spherical aberration, astigmatism and distortion in the first embodiment of an image forming optical system according to the present invention.

FIGS. 4A, 4B and 4C are diagrams showing spherical aberration, astigmatism and distortion in the second embodiment of an image forming optical system according to the present invention.

FIGS. 6A, 6B and 6C are diagrams showing spherical aberration, astigmatism and distortion in the third embodiment of an image forming optical system according to the present invention.

FIGS. 8A, 8B and 8C are diagrams showing a spherical aberration, an astigmatism and a distortion in the fourth embodiment of an image forming optical system according to the present invention.

DETAILED DESCRIPTION OF THE PREFERRED EMBODIMENTS

Figure 3:
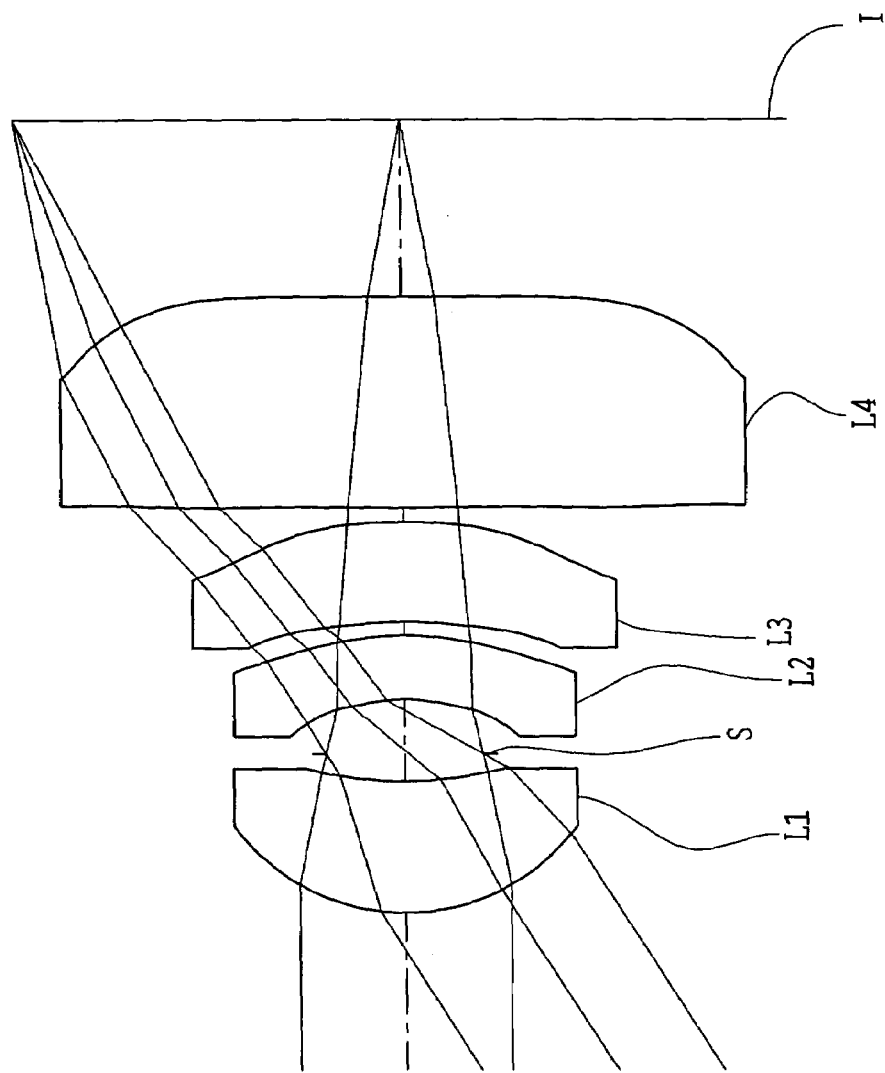
FIG. 3 is a sectional view showing an optical arrangement, developed along the optical axis in the second embodiment of an image forming optical system according to the present invention.

Prior to explaining embodiments, reasons why the constitution of the present invention has been made as well as function and advantages of the present invention will be explained.

Firstly, the number of lens constituting an image forming optical system is explained. Taking into consideration of performance and miniaturization, the image forming optical system of the present invention is constituted with four lenses which are the first lens, the second lens, the third lens and the fourth lens as mentioned above. Here, if the image forming optical system is constituted with five or more lenses, it is evident that the performance is improved further. However, if the number of lens increases by one, the thickness of a lens, the distance between lenses and the space of frames increase accordingly and enlarging of the size is inevitable.

In case that an image forming optical system is constituted with three lenses or less than three lenses, coexistence of reduction of chromatic aberration at the axis and reduction of curvature of field is difficult. Even if many aspherical surfaces are used to secure performance, manufacture is difficult since decentering sensitivity becomes large.

Therefore, as for performance and size, it is the most appropriate that an image forming optical system is constituted with four lenses.

In the image forming optical system of the present invention, the first lens is constituted with a positive meniscus lens having convex surface at the object side. Such constitution contributes to shortening of the whole length, since the principal point position of the first lens shifts to the object side.

When, for example, CCD as an imaging element is used in order to maintain a good performance for condensing light, the incident angle of light to an imaging element must be made small. For this purpose, it is desirable to arrange an aperture stop at a distant position from an image plane, or to arrange an image of the aperture stop at a distant position from an image plane.

In a wide angle optical system it is necessary to reduce generation of distortion in a circumferential portion of a picture image plane and a chromatic aberration of magnification. For this purpose, it is desirable to arrange an aperture stop at the position where power arrangement of an optical system becomes symmetrical.

From such two reasons mentioned above, in the image forming optical system of the present invention the aperture stop is arranged between the second lens and the third lens. That is, the image forming optical system of the present invention is constituted as an optical system in which wide angle and telecentric function are much noted as important factors.

The image forming optical system of the present invention comprises, a first lens which is meniscus lens having positive refracting power and a convex surface directed toward an object side, and a second lens which is meniscus lens having negative refracting power and a concave surface directed toward the object side.

By such arrangement, a deflection angle, that is, an angle which is formed by an incident light and an emanated light, can be kept small, and generation of an aberration at each refracting surface can be suppressed. A fluctuation of the performance of lens at the relative decentering state can be small as much as possible since amount of aberration generated at non decentering state is small.

The fourth lens of the present invention is an important lens in order to make small an incident angle of light to an imaging element.

By strengthening the power of a circumferential portion compared with a center portion with respect to the power of the fourth lens, and by bending greatly a light having high image height to inside direction, the incident angle of light to the imaging element is made moderate.

However, if the light is bent greatly, an aberration tends easily to be generated. Therefore, by forming at least one aspherical surface on the fourth lens of the present invention so that an incident angle and emanated angle of light at the circumferential portion to the imaging element is made to be small, the deflection angle can be made small infinite.

As a result, generation of an aberration can be suppressed, while the power at the circumferential portion is made strong.

Therefore, in the image forming optical system of the present invention, it is important to satisfy the following condition (1):

$$1.0 < \phi m/\phi p < 50.0 \qquad (1)$$

where $\phi m$ represents the power of the fourth lens at the position of the maximum light height and $\phi p$ represents the power of the fourth lens at the position of the paraxis.

Here, the power $\phi m$ of the lens at the position with the maximum light height is defined as follows. It is given by $\phi m = \tan \xi / Hm$, when a parallel light is entered to the maximum light height Hm of the lens to be an object from the infinite point of the object side, and an inclined angle after passing through the lens is $\xi$.

When $\phi m/\phi p$ exceeds the upper limit of this condition (1), the power of the circumferential portion of the lens becomes too much strong and the correction of the incident angle of light becomes excessive.

On the other hand, when it is less than the lower limit, the power of the circumferential portion of the lens becomes too much weak and the correction of the incident angle of light becomes insufficient.

In the image forming optical system of the present invention, it is better to satisfy the following condition (1'):

$$1.1 < \phi m/\phi p < 30.0 \qquad (1')$$

Further, in the image forming optical system of the present invention, it is better to satisfy the following condition (1"):

$$1.2 < \phi m/\phi p < 20.0 \qquad (1'')$$

In the image forming optical system of the present invention, the whole length of the image forming optical system is made small by arranging so that power of the first lens is made strong positive power as power arrangement, and a composite power of the second lens, the third lens and the fourth lens is a weak positive power as power arrangement. Therefore, in order to keep good balance of the whole length of the optical system and the performance in this type of power arrangement, it is desirable to satisfy the following condition (2):

$$0.3 < f1/f < 2.0 \qquad (2)$$

where f1 represents focal length of the first lens and f represents the whole focal length of the whole image forming optical system.

When f1/f exceeds the upper limit of this condition (2), it is disadvantageous for shortening of the whole length of the image forming optical system since the power of the first lens becomes too much small. On the other hand, when it is less than the lower limit of the condition (2), the positive power of the first lens becomes strong. As a result, amount of aberration generated increases, and accordingly, it becomes difficult to secure the performance.

Preferably, in the image forming optical system of the present invention, it is good to satisfy the following condition (2'):

$$0.5 < f1/f < 1.5 \quad (2')$$

Furthermore, preferably in the image forming optical system of the present invention is good to satisfy the following condition (2"):

$$0.7 < f1/f < 1.0 \quad (2'')$$

Moreover, in order that the amount of performance degradation at the time of decentering is small, in the image forming optical system of the present invention, it is important to satisfy the following conditions (3) and (4):

$$-8.0 < r1r/r2f < -0.5 \quad (3)$$

$$0.01 < r2r/r3f < 3.0 \quad (4)$$

where r1r represents the radius of curvature of the first lens at the image side, r2f is the radius of curvature of the second lens at the object side, r2r is the radius of curvature of the second lens at the image side and r3f is the radius of curvature of the third lens at the object side.

Within the limits of the conditions (3) and (4), the deflection angle of the first lens, the second lens and the third lens can be made small. In this way, suppressing of the performance degradation owing to the relative decentering of a lens can be achieved.

When exceeding the upper limit of the conditions (3) and (4), the power at the object side of the first lens and the second lens becomes strong too much. As a result, correction of the spherical aberration and a coma aberration generated on these surfaces becomes difficult on the other surfaces. On the other hand, if it is less than the lower limit of condition (3) and (4), the power at the image side of the first lens and the second lens becomes strong too much. As a result, correction of the spherical aberration and a coma aberration generated on these surfaces becomes difficult the other surfaces.

In the image forming optical system of the present invention, it is good to satisfy the following conditions (3') and (4'):

$$-6.0 < r1r/r2f < -1.0 \quad (3')$$

$$0.03 < r2r/r3f < 1.5 \quad (4')$$

Furthermore, preferably in the image forming optical system of the present invention, it is to satisfy the following conditions (3") and (4"):

$$-4.0 < r1r/r2f < -1.5 \quad (3'')$$

$$0.05 < r2r/r3f < 1.2 \quad (4'')$$

By the way, when CCD is used or an imaging element, the phenomenon so-called shading occurs. This is the phenomenon in which the brightness of the picture image differs at the center portion of the picture image and at the circumferential portion of the picture image when an off-axis light flux emanated from an optical system enters into an image plane.

On the other hand, if an incident angle to the image plane is small, the shading problem is mitigated. But in this case, the whole length of imaging optical system becomes long.

Therefore, in the image forming optical system, it is desirable to satisfy the following condition (5):

$$0.5 < EXP/f < 2.5 \quad (5)$$

where EXP represents the distance of the exit pupil from an image plane and f is the whole focal length of the image forming optical system.

When EXP/f exceeds the upper limit of condition (5), the whole length becomes long. On the other hand, if it is less than the lower limit of condition (5), the angle of incidence to CCD becomes large too much, and the brightness of the circumferential portion of the picture image decreases.

In the image forming optical system, it is desirable to satisfy the following condition (5'):

$$0.7 < EXP/f < 1.8 \quad (5')$$

Furthermore, in the image forming optical system, it is desirable to satisfy the following condition (5"):

$$0.9 < EXP/f < 1.3 \quad (5'')$$

It is desirable that the positive lens as the fourth lens of the present invention is made of plastic, because weight lightening and cheapening manufacture cost can be achieved.

Furthermore, it is desirable that the negative meniscus lens as the second lens of the present invention is constituted with plastic, because weight lightening and cheapening manufacture cost can be achieved.

It is desirable to satisfy the following condition (6):

$$0.30[1/\mu m] < Fno/P[\mu m] < 2.50[1/\mu m] \quad (6)$$

where Fno represents the F number fully opened of the image forming optical system and P represents the pixel pitch of an imaging element.

When Fno/P exceeds the upper limit of the condition, light quantity per one picture element becomes small since the optical system becomes too dark or the pixel pitch of the picture element becomes too small.

Therefore, shutter speed becomes slow, and this brings a cause of hand blur and increase of noise owing to long exposure time. On the other hand, when it is less than the lower limit of the condition, the pixel pitch of the picture element becomes too large and imaging data with fine pixel pitch cannot be obtained.

In the image forming optical system of the present invention, it is better to satisfy the following condition:

$$0.40[1/\mu m] < Fno/P[\mu m] < 2.00[1/\mu m] \quad (6')$$

In the image forming optical system of the present invention, it is more better to satisfy the following condition.

$$0.50[1/\mu m] < Fno/P[\mu m] < 1.50[1/\mu m] \quad (6'')$$

When it is defined that TL represents the whole length of the image forming optical system and ML represents the minimum thickness on the axis of a plastic lens constituting the image forming optical system, it is more better to satisfy the following condition:

$$0.03 < ML/TL < 0.15 \quad (7)$$

When ML/TL exceeds the upper limit of the condition the workability of a glass lens is aggravated, since the thickness of center portion of the glass lens cannot be sufficiently secured because the minimum thickness of a plastic lens on the axis is too big to the whole length of the optical system. On the other hand, when it is less the lower limit, the productivity is aggravated since plastic resin cannot be entered smoothly into a formation die because the minimum thickness of a plastic lens on the axis is too small and accordingly it causes generating stress and double refraction as well as more time consuming for the molding.

In the image forming optical system of the present invention, it is better to satisfy the following condition:

$$0.05 < ML/TL < 0.11 \quad (7')$$

Furthermore, the image forming optical system of the present invention it is more better to satisfy the following condition:

$$0.07 < ML/TL < 0.09 \quad (7'')$$

As for an electric device, it is desirable that it is equipped with the image forming optical system mentioned above.

Hereafter, embodiments of the present invention will be explained using drawings

The First Embodiment

FIG. 1 is a sectional view showing an optical arrangement developed along the optical axis in the first embodiment of an image forming optical system according to the present invention. FIGS. 2A, 2B and 2C show spherical aberration, astigmatism and distortion of an image forming optical system in the first embodiment respectively.

In FIG. 1, this image forming optical system comprises, in order from an object side, a positive meniscus lens L1, an aperture stop S, a negative meniscus lens L2, a positive meniscus lens L3, and a positive lens L4. All refracting surfaces of these lenses mentioned above are aspherical. In FIG. 1, the reference symbol I represents an image plane of an imaging element.

The meniscus lens L1 is the first lens, a convex surface of which is directed toward an object side. The lens 2 is the second lens, concave surface of which is directed toward an object side. The positive meniscus is the third lens, a convex surface of which is directed toward an image side. The positive lens L4 is the fourth lens, both surfaces of which is convex.

Lens data of optical members constituting the image forming optical system of the first embodiment are listed below.

In the first embodiment, all lenses are made of plastic. As plastic materials used here, Zeonex which is polyolefin material is used for the first lens L1, the third lens L3 and the fourth lens L4, and polycarbonate is used for the second lens L2.

On the image plane of the image forming optical system, an imaging element having 3,000,000 pixels (a pitch of picture element 2.4 μm) in ⅓ inches square is arranged.

Also, when z is taken as the coordinate in the direction of the optical axis, y is taken as the coordinate normal to the optical axis, K represents a conic constant, and a, b, c, and d represent aspherical coefficients, the configuration of each of the aspherical surface is expressed by the following equation:

$$z = (y^2/r)/[1 + \{1 - (1+K)(y/r)^2\}^{1/2}] + ay^4 + by^6 + cy^8 + dy^{10}$$

These symbols hold for the numerical data of embodiments be described later.

Numerical Data 1
the focal length: 4.60 mm, Fno (fully opened F number): 3.5, the image height: 3.0 mm, the half field angle: 33°.

| Surface No. | Radius curvature | Surface distance (Air space) | Refraction Index | Abbe's No. |
|---|---|---|---|---|
| object surface | ∞ | ∞ | | |
| 1 | aspherical surface[1] | 0.98 | 1.5091 | 56.2 |
| 2 | aspherical surface[2] | 0.12 | | |
| 3 | aperture stop surface | 0.53 | | |
| 4 | aspherical surface[3] | 0.50 | 1.5839 | 30.2 |
| 5 | aspherical surface[4] | 0.05 | | |
| 6 | aspherical surface[5] | 0.98 | 1.5091 | 56.2 |
| 7 | aspherical surface[6] | 0.05 | | |
| 8 | aspherical surface[7] | 2.64 | 1.5091 | 56.2 |
| 9 | aspherical surface[8] | 0.60 | | |
| image plane | ∞ | | | | aspherical surface[1]
radius of curvature 1.33
$k = 7.5798 \times 10^{-2}$
$a = 6.8323 \times 10^{-3}$  $b = 7.0011 \times 10^{-3}$ aspherical surface[2]
radius of curvature 3.30
$k = 1.6269 \times 10$
$a = -4.4165 \times 10^{-2}$  $b = -5.1535 \times 10^{-2}$  $c = -1.3163 \times 10^{-1}$
$d = -4.6932 \times 10^{-3}$ aspherical surface[3]
radius of curvature −0.90
$k = -7.8922 \times 10^{-1}$
$a = -1.0535 \times 10^{-1}$  $b = -4.6823 \times 10^{-3}$  $c = 4.6585 \times 10^{-2}$
$d = -9.9136 \times 10^{-1}$ aspherical surface[4]
radius of curvature −1.23
$k = -1.4014 \times 10^{+0}$
$a = -5.8390 \times 10^{-4}$  $b = 1.8702 \times 10^{-2}$ aspherical surface[5]
radius of curvature −10.36
$k = 1.6053 \times 10^{+1}$
$a = 1.3798 \times 10^{-4}$  $b = -2.5576 \times 10^{-2}$  $c = 1.6382 \times 10^{-2}$
$d = -3.1037 \times 10^{-3}$ aspherical surface[6]
radius of curvature −4.45
$k = -4.9016 \times 10^{+0}$
$a = -3.0400 \times 10^{-2}$  $b = 1.7725 \times 10^{-3}$ aspherical surface[7]
radius of curvature 500.00
$k = -3.5486 \times 10^{+19}$
$a = 1.2022 \times 10^{-2}$  $b = -7.0126 \times 10^{-4}$ aspherical surface[8]
radius of curvature −9.84
$k = -5.9318 \times 10^{+8}$
$a = 3.3798 \times 10^{-3}$  $b = -7.3468 \times 10^{-4}$

The Second Embodiment

FIG. 3 is a sectional view showing an optical arrangement developed along the optical axis in the first embodiment of an image forming optical system according to the present invention. FIGS. 4A, 4B and 4C show spherical aberration, astigmatism and distortion of an image forming optical system in the second embodiment respectively.

The image forming optical system of the second embodiment comprises, in order from an object side, a positive meniscus lens L1, an aperture stop S, a negative meniscus lens L2, a positive meniscus lens L3, and a positive lens L4. All refracting surfaces of these lenses mentioned above are aspherical. In FIG. 3, the reference symbol I represents an image plane of an imaging element.

The meniscus lens L1 is the first lens, a convex surface of which is directed toward an object side. The lens 2 is the second lens, concave surface of which is directed toward an object side. The positive meniscus is the third lens, a convex surface of which is directed toward an image side. The positive lens L4 is the fourth lens, both surfaces of which is convex.

Lens data of optical members constituting the image forming optical system of the second embodiment are listed below.

In the second embodiment, the first lens L1 is made of glass. The second lens L2, the third lens L3 and the fourth lens L4 are made of plastic. As plastic materials used here, Zeonex which is polyolefin material is used for the third lens L3 and the fourth lens L4, and polycarbonate is used for the second lens L2. On the image plane of the image forming optical system, an imaging element having 2,000,000 pixels (a pitch of picture element 3.0 μm) in ⅓ inches square arranged.

Numerical Data 2
the focal length: 4.70 mm, Fno (fully opened F number): 2.8, the image height: 3.0 mm, the half field angle: 33°.

| Surface No. | Radius curvature | Surface distance (Air space) | Refraction Index | Abbe's No. |
|---|---|---|---|---|
| object surface | ∞ | ∞ | | |
| 1 | aspherical surface[1] | 1.01 | 1.6779 | 55.3 |
| 2 | aspherical surface[2] | 0.21 | | |
| 3 | aperture stop surface | 0.43 | | |
| 4 | aspherical surface[3] | 0.50 | 1.5839 | 30.2 |
| 5 | aspherical surface[4] | 0.10 | | |
| 6 | aspherical surface[5] | 0.78 | 1.5091 | 56.2 |
| 7 | aspherical surface[6] | 0.10 | | |
| 8 | aspherical surface[7] | 1.63 | 1.5091 | 56.2 |
| 9 | aspherical surface[8] | 1.38 | | |
| Image plane | ∞ | | | |

Aspherical surface [1]

radius of curvature 1.78
$k = 2.0971 \times 10^{-1}$
$a = 2.3654 \times 10^{-3}$  $b = 3.1037 \times 10^{-3}$
aspherical surface[2]

radius of curvature 3.57
$k = 4.8780 \times 10^{+0}$
$a = 3.2966 \times 10^{-3}$  $b = -1.5751 \times 10^{-2}$
aspherical surface[3]

radius of curvature −1.72
$k = -1.4015 \times 10^{+0}$
$a = -3.6868 \times 10^{-2}$  $b = -5.6464 \times 10^{-3}$  $c = -6.7915 \times 10^{-2}$
aspherical surface[4]

radius of curvature −2.24
$k = -2.4168 \times 10^{+0}$
$a = 3.7716 \times 10^{-2}$  $b = -1.2219 \times 10^{-2}$
aspherical surface[5]

radius of curvature −4.40
$k = 1.0107 \times 10^{+1}$

Figure 5:
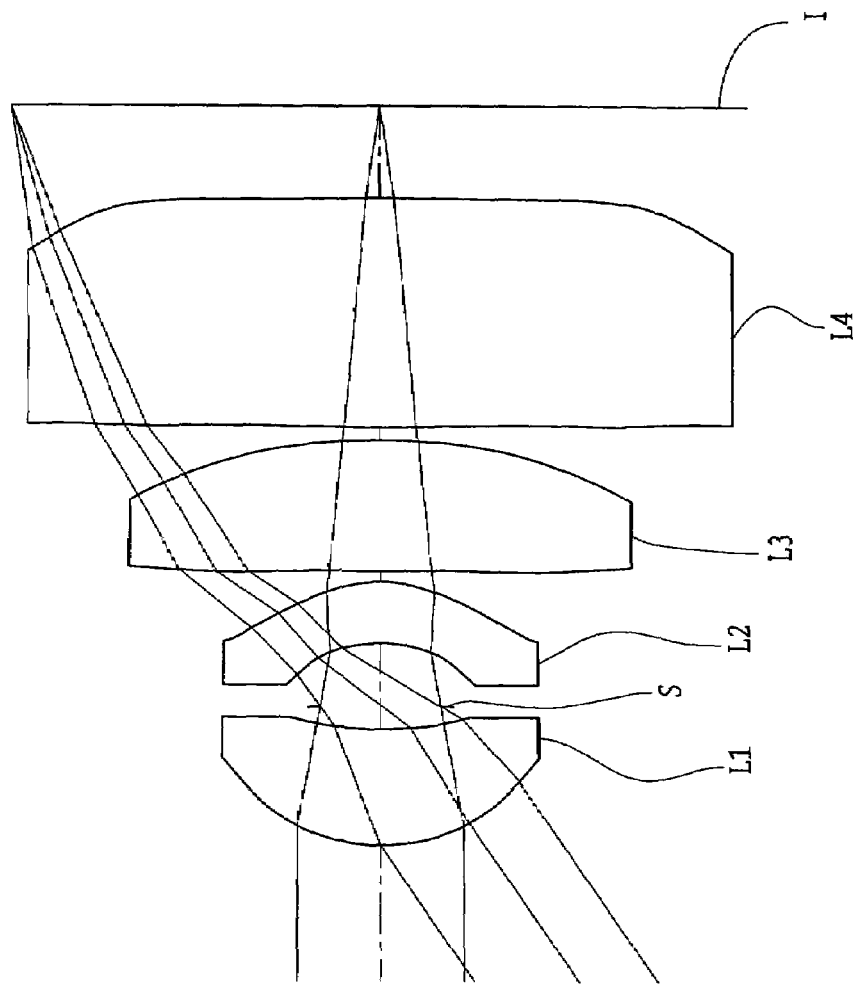
FIG. 5 is a sectional view showing an optical arrangement, developed along the optical axis in the third embodiment of an image forming optical system according to the present invention.

-continued $a = 3.0421 \times 10^{-2}$  $b = -9.2829 \times 10^{-3}$
aspherical surface[6]

radius of curvature −2.87
$k = -2.5874 \times 10^{+0}$
$a = -1.6234 \times 10^{-2}$  $b = 2.9518 \times 10^{-3}$
aspherical surface[7]

radius of curvature 300.00
$k = -3.5486 \times 10^{+19}$
$a = 4.6389 \times 10^{-4}$  $b = -1.5500 \times 10^{-5}$
aspherical surface[8]

radius of curvature −84.94
$k = -5.9318 \times 10^{+8}$
$a = -4.9294 \times 10^{-3}$  $b = -1.4313 \times 10^{-3}$ The Third Embodiment FIG. 5 is a sectional view showing an optical arrangement developed along the optical axis in the third embodiment of an image forming optical system according to the present invention. FIGS. 6A, 6B and 6C show spherical aberration, astigmatism and distortion of an image forming optical system in the third embodiment respectively.

The image forming optical system of the third embodiment comprises, in order from an object side, a positive meniscus lens L1, an aperture stop S, a negative meniscus lens L2, a positive meniscus lens L3, and a positive lens L4. All refracting surfaces of these lenses mentioned above are aspherical. In FIG. 5, the reference symbol I represents an image plane of an imaging element.

The meniscus lens L1 is the first lens, a convex surface of which is directed toward an object side. The lens 2 is the second lens, concave surface of which is directed toward an object side. The positive meniscus is the third lens, a convex surface of which is directed toward an image side. The positive lens L4 is the fourth lens, both surfaces of which is convex.

Lens data of optical members constituting the image forming optical system of the third embodiment are listed below.

In the third embodiment, the first lens L1 and the third lens L3 are made of glass. The second lens L2 and the fourth lens L4 are made of plastic. As plastic materials used here, Zeonex which is polyolefin material is used for the fourth lens L4 and polycarbonate is used for the second lens L2. On the image plane of the image forming optical system, an imaging element having 2,000,000 pixels (a pitch of picture element 3.0 μm) in ⅓ inches square is arranged.

Numerical Data 3
the focal length: 4.50 mm, Fno (fully opened F number): 3.2, the image height: 3.0 mm, the half field angle: 34°.

| Surface No. | Radius curvature | Surface distance (Air space) | Refraction Index | Abbe's No. |
|---|---|---|---|---|
| object surface | ∞ | ∞ | | |
| 1 | aspherical surface[1] | 0.97 | 1.6779 | 55.3 |
| 2 | aspherical surface[2] | 0.20 | | |
| 3 | aperture stop surface | 0.52 | | |
| 4 | aspherical | 0.50 | 1.5839 | 30.2 |

-continued

Figure 7:
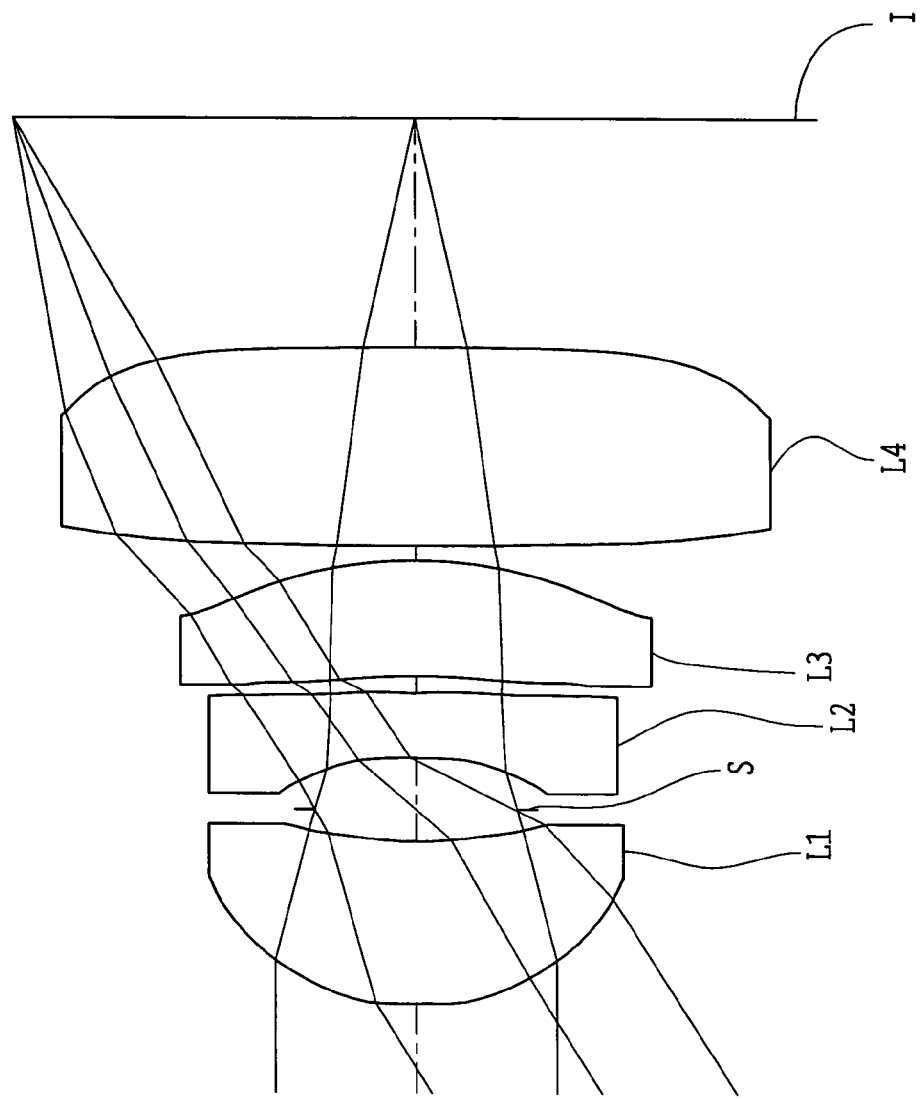
FIG. 7 is a sectional view showing an optical arrangement, developed along the optical axis in the fourth embodiment of an image forming optical system according to the present invention.

| | | surface[3] | | | |
|---|---|---|---|---|---|
| 5 | | aspherical surface[4] | 0.10 | | |
| 6 | | aspherical surface[5] | 1.09 | 1.5091 | 56.2 |
| 7 | | aspherical surface[6] | 0.10 | | |
| 8 | | aspherical surface[7] | 1.91 | 1.5091 | 56.2 |
| 9 | | aspherical surface[8] | 0.79 | | |
| image plane | | ∞ | | | | aspherical surface[1]

radius of curvature 1.63
$k = 1.8093 \times 10^{-1}$
$a = 4.5318 \times 10^{-3}$   $b = 4.1201 \times 10^{-3}$ aspherical surface[2]

radius of curvature 2.86
$K = 3.9847 \times 10^{+0}$
$a = 9.5441 \times 10^{-4}$   $b = -2.8751 \times 10^{-2}$ aspherical surface[3]

radius of curvature −1.05
$k = -4.4472 \times 10^{-1}$
$a = -7.1775 \times 10^{-2}$   $b = 7.1040 \times 10^{-2}$   $c = -1.6964 \times 10^{-1}$ aspherical surface[4]

radius of curvature −1.26
$k = -7.4056 \times 10^{-1}$
$a = 1.0694 \times 10^{-2}$   $b = 4.1614 \times 10^{-2}$ aspherical surface[5]

radius of curvature −19.08
$k = 2.2912 \times 10^{+1}$
$a = 1.3407 \times 10^{-2}$   $b = -1.4085 \times 10^{-3}$ aspherical surface[6]

radius of curvature −6.50
$k = 3.1891 \times 10^{+0}$
$a = -1.7929 \times 10^{-2}$   $b = 2.3492 \times 10^{-3}$ aspherical surface[7]

radius of curvature 300.00
$k = -3.5486 \times 10^{+19}$
$a = 1.5087 \times 10^{-3}$   $b = -1.4407 \times 10^{-4}$ aspherical surface[8]

radius of curvature −20.64
$k = -5.9318 \times 10^{+8}$
$a = -1.0964 \times 10^{-3}$   $b = -6.6442 \times 10^{-4}$ The Fourth Embodiment FIG. 7 is a sectional view showing an optical arrangement developed along the optical axis in the fourth embodiment of an image forming optical system according to the present invention. FIG. 8 shows spherical aberration, astigmatism and distortion of an image forming optical system in the fourth embodiment respectively.

The image forming optical system in the fourth embodiment comprises, in order from an object side, a positive meniscus lens L1, an aperture stop S, a negative meniscus lens L2, a positive meniscus lens L3, and a positive lens L4. All refracting surfaces of these lenses mentioned above are aspherical. In FIG. 7, the reference symbol I represents an image plane of an imaging element.

The meniscus lens L1 is the first lens, a convex surface of which is directed toward an object side. The lens 2 is the second lens, concave surface of which is directed toward an object side. The positive meniscus is the third lens, a convex surface of which is directed toward an image side. The positive lens L4 is the fourth lens, both surfaces of which is convex.

Lens data of optical members constituting the image forming optical system of the fourth embodiment are listed below.

In the fourth embodiment, the first lens L1 and the third lens L3 are made of glass. The second lens L2 and the fourth lens L4 are made of plastic. As plastic materials used here, Zeonex which is polyolefin material is used for the fourth lens L4, and polycarbonate is used for the second lens L2.

On the image plane of the image forming optical system, an imaging element having 1,300,000 pixels (a pitch of picture element 3.6 μm) in ⅓ inches square is arranged.

Numerical Data 4
the focal length: 4.90 mm, Fno (fully opened F number): 2.4, the image height: 3.0 mm, the half field angle: 31°.

| Surface No. | Radius curvature | Surface distance (Air space) | Refraction Index | Abbe's No. |
|---|---|---|---|---|
| object surface | ∞ | ∞ | | |
| 1 | aspherical surface[1] | 1.22 | 1.5831 | 59.4 |
| 2 | aspherical surface[2] | 0.23 | | |
| 3 | aperture stop surface | 0.40 | | |
| 4 | aspherical surface[3] | 0.50 | 1.5839 | 30.2 |
| 5 | aspherical surface[4] | 0.11 | | |
| 6 | aspherical surface[5] | 0.87 | 1.8061 | 40.9 |
| 7 | aspherical surface[6] | 0.10 | | |
| 8 | aspherical surface[7] | 1.50 | 1.5091 | 56.2 |
| 9 | aspherical surface[8] | 1.73 | | |
| image plane | ∞ | | | | aspherical surface[1]

radius of curvature 1.82
$k = 3.5885 \times 10^{-1}$
$a = -1.1794 \times 10^{-3}$   $b = 5.3463 \times 10^{-4}$ aspherical surface[2]

radius of curvature 4.06
$k = 5.2264 \times 10^{+0}$
$a = 1.1141 \times 10^{-2}$   $b = 1.0771 \times 10^{-3}$ aspherical surface[3]

radius of curvature −2.28
$k = -2.0296 \times 10^{+0}$
$a = -3.0425 \times 10^{-2}$   $b = -8.3232 \times 10^{-3}$   $c = -3.7680 \times 10^{-2}$ aspherical surface[4]

radius of curvature −7.13
$k = -4.1823 \times 10^{+1}$
$a = 4.7941 \times 10^{-2}$   $b = -1.5400 \times 10^{-2}$ aspherical surface[5]

radius of curvature −7.16
$k = 1.9967 \times 10^{+1}$
$a = 2.7582 \times 10^{-2}$   $b = -1.7023 \times 10^{-4}$ aspherical surface[6]

radius of curvature −2.79
$k = -6.1217 \times 10^{+0}$
$a = -2.7227 \times 10^{-2}$   $b = 6.7906 \times 10^{-3}$ aspherical surface[7]

radius of curvature 300.00

-continued k = -3.5486 × 10$^{+19}$
a = 3.5355 × 10$^{-3}$   b = -1.1022 × 10$^{-4}$
aspherical surface[8]

radius of curvature -247.18
k = -5.9318 × 10$^{+8}$
a = -6.7287 × 10$^{-3}$   b = -7.6835 × 10$^{-4}$ In each embodiment of the present invention, at least one of lenses is made of plastic. However, such lens can be constituted with glass instead of plastic. For example, if the lenses are constituted with glass having refractive index higher than those used in the embodiments, an optical system with higher performance can be achieved. If special low dispersion glass is used, it is effective for the correction of chromatic aberration. Moreover, when a lens is constituted with plastic, degradation of the performance owing to environmental change can be mitigated by using low moisture-absorption material.

In each embodiment mentioned above, a flare cut stop may be used instead of an aperture stop in order to cut an unnecessary light of ghost, flare and the like. This flare cut aperture may be arranged in any place which is either in front of the first lens, between the first lens and the aperture stop, between the aperture stop and the second lens, between the second lens and the third lens, or between the third lens and the image plane.

In order to get function of the flare cut stop, it is possible to use a method in which a flare light is cut by a frame, or another method in which a flare light is cut by arranging another member. Also, it is possible to constitute a flare cut stop by printing, painting and gluing a seal and the like, directly to the image forming optical system. As to the shape of the stop, any type of shape formed by such as a circle, an ellipse, a rectangle, a polygon and a scope surrounded by a function curve can be also used.

By arranging a flare stop, it is possible to cut not only detrimental luminous flux but also luminous flux of the coma flare and the like at a circumferential portion on the picture plane.

Moreover, when a coating for preventing of reflection is made to each lens, a ghost and flare can be reduced. If a multiple coating is made, the ghost and the flare can be efficiently reduced. Furthermore, infrared cut coating can be also made to a surface of a lens and a cover glass and the like.

In each embodiment mentioned above, focusing can be carried out for adjusting the focus. As focusing methods, it is possible to use any of method such as a method where the whole lenses or a part of lenses is moved outward for focusing, or a method where the whole lenses or the other type method where a part of lenses is moved inward for focusing.

In each embodiment mentioned above, decrease of the brightness around circumferential portion of a picture image plane can be reduced by shifting a micro lens of CCD. For example, the design of the micro lens of CCD may be changed according to the incidence angle of light at each image height. Correction of decreased quantity of the brightness around circumferential portion of a picture image plane can be carried out by image processing.

Although illustration has not been given, the optical system of the present invention is suitable also for an optical equipment such as a camera and a surveillance camera in which film or CCD is used as recording member. Therefore, an optical device equipped with the optical system mentioned above is also included in the present invention.

The numerical values calculated by the conditions of each embodiment 1 to 4 mentioned above are shown in the following table 1.

TABLE 1

|  | the first embodiment | the second embodiment | the third embodiment | the fourth embodiment |
|---|---|---|---|---|
| Φm/ΦP | 1.31 | 9.13 | 2.09 | 18.87 |
| F1/f | 0.81 | 0.91 | 0.94 | 0.96 |
| R1r/r2f | -3.69 | -2.08 | -2.72 | -1.78 |
| R2r/r3f | 0.12 | 0.51 | 0.07 | 1.00 |
| EXP/f | 1.2 | 0.94 | 1.04 | 0.98 |
| Fno/P [μm] | 1.46 | 0.93 | 1.07 | 0.67 |
| ML/TL | 0.078 | 0.081 | 0.081 | 0.075 |

Figure 9A:
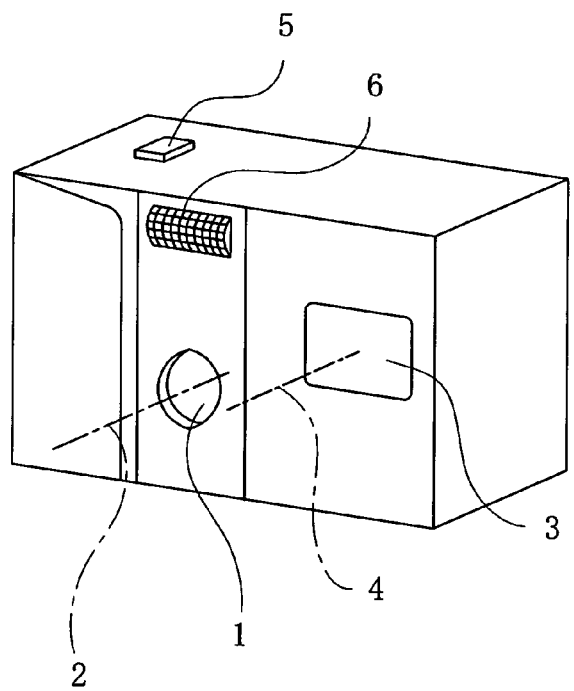
FIGS. 9A and 9B are a front view and a rear view showing an outlined construction of a cellular phone embodied by an image forming optical system according to the present invention.
Figure 9B:
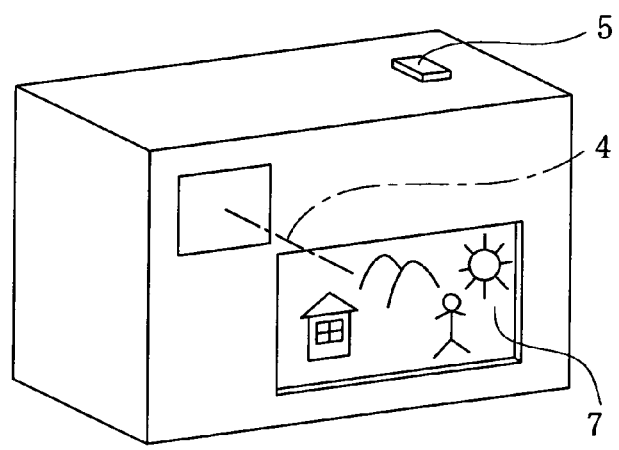

FIGS. 9A and 9B are a front perspective view and a rear perspective view showing an external appearance of a digital camera in which an image forming optical system according to the present invention is used in a photographing optical system. In FIG. 9, reference numeral 1 represents a photographing optical system having photographing optical path 2, reference numeral 3 is a finder optical system with an optical path 4 for finder, reference numeral 5 is a shutter button, reference numeral 6 is a flush lump and reference numeral 7 is a monitor with liquid crystal display. When pressing the shutter button 5 arranged on the camera, in responding such action, photographing is carried out via the photographing optical system 1.

Figure 10A:
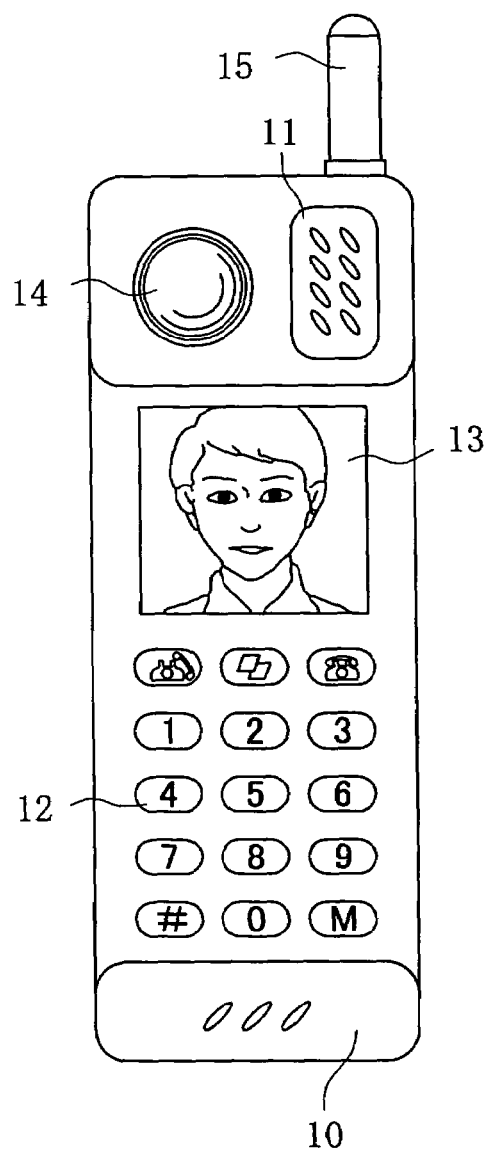
FIGS. 10A and 10B are a front perspective view and a rear perspective view showing an outlined construction of a digital camera embodied by an image forming optical system according to the present invention.
Figure 10B:
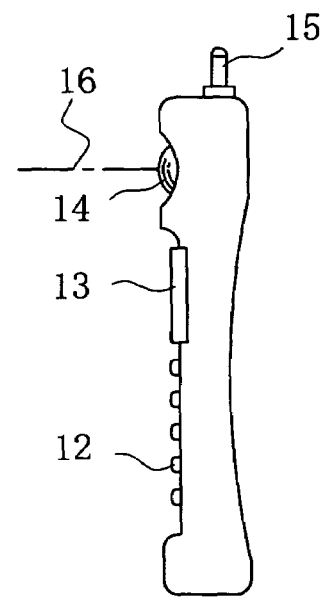

FIGS. 10A and 10B are a front view and a side view showing an example of a cellular phone in which an image forming optical system according to the present invention is used in a photographing optical system. In FIG. 10, reference numeral 10 represents a microphone portion, reference numeral 11 is a speaker portion, 12 is an input dial, 13 is a monitor, 14 is a photographing optical system and 15 is an antenna by which transmission and reception of electric waves for communication is performed. The microphone portion 10 inputs an operator's voice as information, and the speaker portion 11 outputs a communication partner's voice. The input dial 12 is used for an operator inputting information, and the monitor 13 displays information, such as photographed image of the operator as well as a telephone call partner, and a telephone number.

The photographing optical system 14 has the image forming optical system of the present invention arranged on the photographing optical path 16, and the imaging element which receives an image light, which are arranged in the cellular phone. An IR cut filter is arranged in front of an imaging element, and a cover glass for protecting this optical system at the top of the photographing optical system 14 is arranged. The object image received with the imaging element is inputted into the processing means (not illustrated) which is built in the cellular phone, and is displayed as an electronic picture on the monitor 13 and/or another monitor at a communication partner's side. When transmitting a picture image to a communication partner, an information of the object image received by the imaging element is converted into a signal which can be transmitted, by the signal-processing function included in the processing means mentioned above.

What is claimed is:

1. An image forming optical system consisting essentially of, in order from an object side with no intervening lenses:

a first lens which is a meniscus lens having positive refracting power and a convex surface directed toward the object side, an aperture stop, a second lens which is a meniscus lens having negative refracting power and a concave surface directed toward the object side, a third lens having positive refracting power and a convex surface directed toward an image side, and a fourth lens having positive refracting power and double convex surfaces.

2. An image forming optical system according to claim 1, wherein at least one of the surfaces of the fourth lens is aspherical, and the following condition is satisfied:

$$1.0 < \phi m/\phi p < 50.0$$

where $\phi m$ represents power of the fourth lens at a position of the maximum light height and $\phi p$ represents power of the fourth lens at a paraxial position.

3. An image forming optical system according to claim 1, satisfying the following condition:

$$0.3 < f1/f < 2.0$$

where f1 represents the focal length of the first lens and f represents the focal length of the entire image forming optical system.

4. An image forming optical system according to claim 1, further comprising a pixilated imaging element and satisfying the following condition:

$$0.30(1/\mu m) < Fno/P(\mu m) < 2.50(1/\mu m)$$

where Fno represents the F number fully opened and P represents the pixel pitch of the imaging element.

5. An image forming optical system according to claim 1, comprising at least one plastic lens and satisfying the following condition:

$$0.03 < ML/TL < 0.15$$

where TL represents the entire length of the image forming optical system and ML represents the axial thickness of a plastic lens that has the smallest axial thickness among all plastic lenses within the image forming optical system.

6. An imaging optical system according to claim 1, satisfying the following conditions:

$$-8.0 < r1r/r2f < 0.5$$

$$0.01 < r2r/r3f < 3.0$$

where r1r represents the radius of curvature of the first lens at the image side, r2f is the radius of curvature of the second lens at the object side, r2r is the radius of curvature of the second lens at the image side and r3f is the radius of curvature of the third lens at the object side.

7. An image forming optical system according to claim 1, satisfying the following condition:

$$0.5 < EXP/f < 2.5$$

where EXP represents the distance of an exit pupil from an image plane and f is the focal length of the entire image forming optical system.

8. An image forming optical system according to claim 1, wherein the fourth lens is made of plastic.

9. An image forming optical system according to claim 1, wherein the second lens is made of plastic.

10. An electric device equipped with the image forming optical system of claim 1.

* * * * *